Sept. 27, 1966      H. MENELL      3,275,056

PNEUMATIC VEHICLE TIRE

Filed Feb. 23, 1965      2 Sheets-Sheet 1

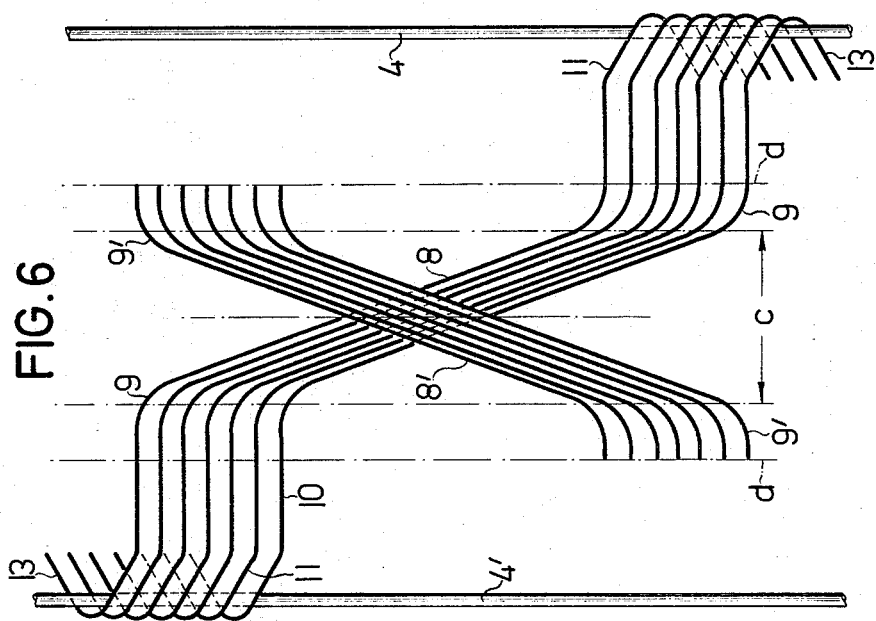
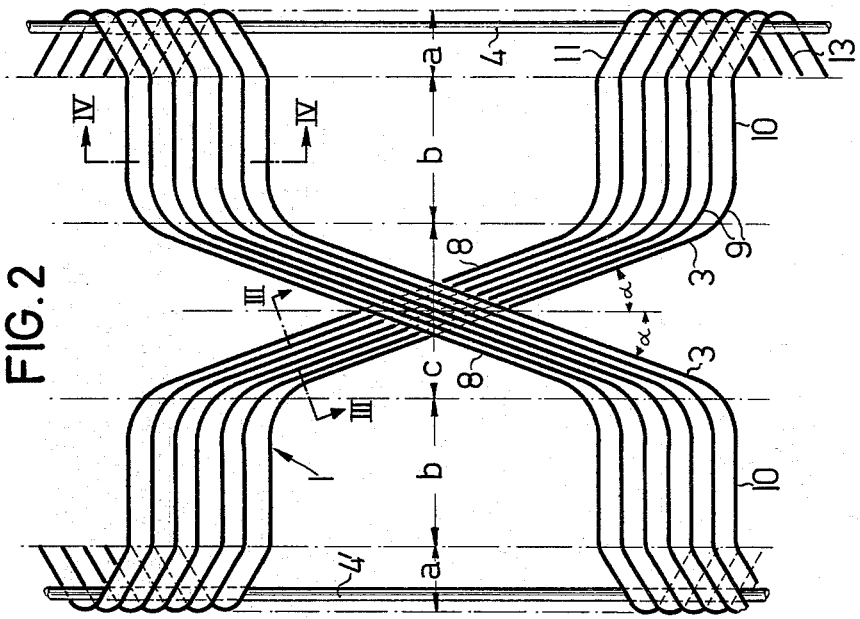

United States Patent Office 3,275,056
Patented Sept. 27, 1966

3,275,056
PNEUMATIC VEHICLE TIRE
Hans Menell, Ahlem, Hannover, Germany, assignor to Continental Gummi-Werke Aktiengesellschaft, Hannover, Germany
Filed Feb. 23, 1965, Ser. No. 434,442
Claims priority, application Germany, Feb. 25, 1964, C 32,241
18 Claims. (Cl. 152—356)

The present invention relates to a pneumatic vehicle tire with carcass layers extending from bead to bead in which each carcass layer has parallel cords, such as threads or wires, which within the tire side walls extend at a right angle or approximately at a right angle with regard to the circumferential direction of the tire, and which below the tread strip extend at an incline with regard to the circumferential direction of the tire and cross each other.

With tires of the above-mentioned type it is known so to select the angle formed by the tire sections of the cords below the tread strip that said cords form with the circumferential direction of the tire an angle of from 30 to 70°. In addition to the above-mentioned cords crossing each other, the heretofore known tires of the just-mentioned type have a plurality of pull-resistant cords arranged below the tread strip and extending substantially in the circumferential direction of the tire. With tires of this type, the cords extending in the circumferential direction of the tire serve for limiting or determining the outer diameter of the tire. In other words, they prevent the tire diameter from growing beyond a certain magnitude, whereas the above-mentioned cords or thread sections which cross each other confine a relatively large angle with the circumferential direction of the tire because when circumferential cords or threads are provided thereabove, the said cords or threads which cross each other are intended to prevent a transverse expansion of the tire body.

It is an object of the present invention to provide a tire which has the properties of a belted tire while making superfluous a belt formed by additional cords, for instance threads or wires.

It is also an object of the present invention to provide a pneumatic tire in which the carcass portion below the thread strip will have the function of a belt in the tire.

It is a further object of this invention to provide a tire as set forth above which will prevent an undesired transverse expansion of the tire body below the thread strip.

These and other objects and advantages of the invention will appear more clearly from the following specification in connection with the accompanying drawings, in which.

Figure 1:
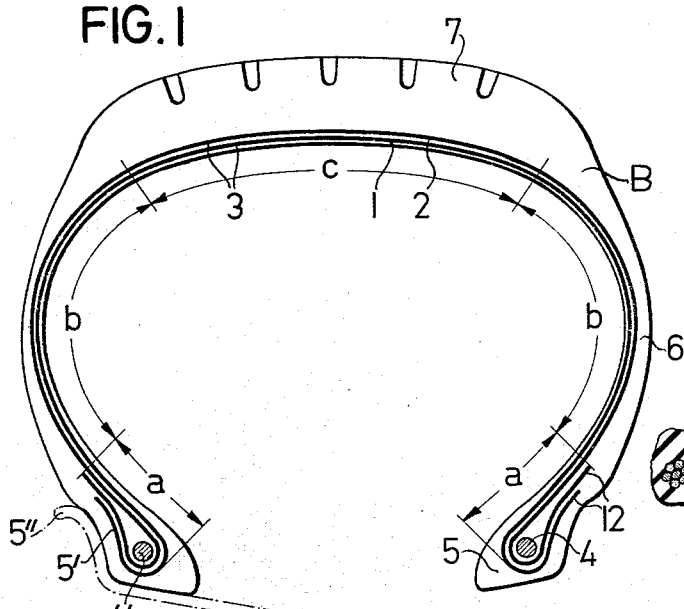
FIG. 1 illustrates a transverse section through a pneumatic vehicle tire according to the present invention.

FIG. 2 diagrammatically illustrates portions of the reinforcing inserts of the tire while for reasons of clarity the reinforcing inserts of FIG. 1 are shown as if they were located in one plane.

Figure 3:
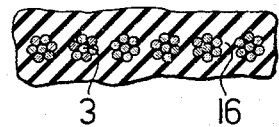

FIG. 3 is a section taken along the line III—III of FIG. 2.

Figure 4:
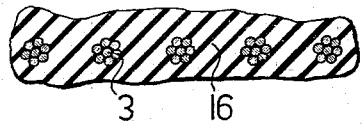

FIG. 4 represents a section taken along the line IV—IV of FIG. 2.

Figure 5:
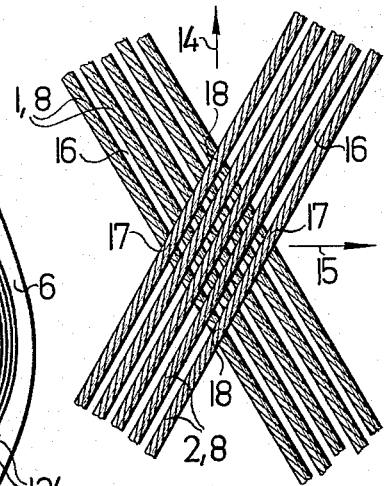

FIG. 5 illustrates on a somewhat larger scale than that of FIGS. 1 and 2 thread sections crossing each other and arranged below the tread strip of a tire according to FIG. 1.

FIG. 6 represents a modification over the arrangement of FIG. 2 and differs therefrom in that the carcass threads of one carcass only are anchored around the beads.

As outlined above, the present invention concerns a pneumatic vehicle tire with carcass layers in which the threads of at least one carcass layer extend from bead to bead and have portions, which are located in the tire side walls, extending substantially at a right angle with regard to the circumferential direction of the tire while other portions of the threads of one carcass layer which are located below the tread strip cross with adjacent threads of another carcass layer. A tire of this type is in conformity with the present invention characterized in that those thread sections of the carcass layers which cross each other form an angle of about 5 to 25°, preferably 15°, with the circumferential direction of the tire while in each carcass layer the distance of those thread sections which cross each other is substantially less than the distance of the threads which pertain to the respective same carcass layer and are located in the wire side walls.

Referring now to the drawings in detail, the tire shown in FIG. 1 comprises a tire body B of rubber material which is reinforced by inserts more specifically referred to in connection with FIG. 2.

The carcass of the tire as shown in the drawings consists of two superimposed rubberized layers 1, 2 each of which has parallel pull-resistant threads 3. In this connection it may be mentioned that the term threads is intended not only to cover threads of fiber material but also covers wires. As will be seen from the drawing, the threads as shown in FIGS. 1 and 2 extend in a manner known per se from bead 5 to bead 5'. The ends of said threads are looped around the bead cores 4, 4' in said beads 5, 5' respectively and are firmly anchored therein.

As has been indicated in FIG. 1, the wall of the tire may be divided into wall sections $a$, $b$ and $c$. The section $a$ represents the bead section which extends from approximately the innermost end of the threads up to approximately the rim flange 5''. Section $b$ represents the tire side walls 6 which should be highly flexible. The zenith portion of the tire is designated with the letter $c$, and its width substantially equals the width of tread strip 7.

The two carcass layers 1 and 2, i.e. the threads 3 forming the same have a different direction in the various sections $a$, $b$ and $c$ as is clearly indicated in FIG. 2. For purposes of simplifying the illustration, only seven pull-resistant threads 3 of each carcass layer 1 and 2 have been illustrated. It is self-understood that the threads 3 are followed by other threads over the entire tire circumference.

Thread sections 8 located within the range $c$ extend at an incline with regard to the circumferential direction of the tire and, more specifically, at an angle $\alpha$ of from 5 to 25°, preferably about 15°. As will be seen from the drawing, the thread sections 8 cross each other which means that the threads of carcass layer 1 extend within the range $c$ in one direction while the threads of carcass layer 2 extend in the other inclined direction. Within the area within which the thread portions pass from range c to range b, threads 3 are curved. These curvatures are indicated with the reference numeral 9 in FIG. 2. The radii of curvature are relatively large and amount to a multiple of the diameter of the threads. Preferably, the said radii of curvature are about from 20 to 60 times the diameter of the individual thread. The said curved sections merge with the straight thread sections 10 which are located in wall section b, i.e. in the tire side walls 6. Thread sections 10 extend at a right angle or approximately at a right angle with regard to the circumferential direction of the tire so that highly flexible tire side walls 6 are obtained. In the merging area between sections b and a, approximately close above the rim edge 5", the threads 3 are angled off or bent so that the sections 11 extend in nearly the same inclined direction as the thread sections 8 but at a larger angle of for instance from 50 to 65°. Threads 3 then pass around bead cores 4, and the folded back ends 12 of the carcass inserts 1, 2 form the sections 13 which in FIG. 2 have in part been indicated by dash lines. The direction in which thread sections 13 extend corresponds substantially to the direction of thread sections 11 but so as to form an image thereto.

The design of the thread section a has the advantage that the thus formed cross connection greatly contributes to a consolidation and strengthening of the bead portions 5, 5' of the tire.

The arrangement of threads 3 in wall section c brings about a belt-like strengthening of the tire for absorbing circumferential forces 14 (FIG. 5) and transverse forces 15, whereas, as mentioned above, the tire side walls 6 will be very flexible in view of the extension of thread sections 10 in a direction transverse to the circumferential direction of the tire.

FIGS. 2 to 4 also show that within the wall section c threads 3 are very close to each other whereas the distance between the threads 3 in the side wall 6 represented by the section b is greater. Thus, for the wall section c there may be provided one thread per one unit of width whereas in the section 6 there may be provided one thread for 2.5 to 3 units of width.

FIGS. 3 and 4 furthermore indicate that between adjacent threads 3 in wall section c there is provided only a small amount of rubber or rubber parts 16 of narrow width in contrast to the arrangement of FIG. 4. The close arrangement of threads 3 brings about that although thread sections 8 are arranged at an angle α, a sufficiently large strength in transverse direction will be obtained. The forces produced by the inner tire pressure and acting in the direction of the arrow 15 will therefore not bring about an undue broadening of section c.

In order to be able within wall section c to obtain a higher strength in transverse direction, the vulcanized tire may following its vulcanization be mounted on a rim and then be subjected to an inner pressure of from 0.5 to 6 K/cm.² In this connection also a special heat treatment may be carried out, for instance the tire may be subjected to a temperature of from 120 to 180° C.

However, it is also possible to subject the tire to an increased inner pressure when the tire has just been taken out of the vulcanizing mold, i.e. is still hot. The tire body thus subjected to tension should remain in this condition until it has reached room temperature. In this way when looking in transverse direction of the tire, a pre-pulling load will occur between adjacent crossing points 17 of thread section 8, and between adjacent crossing points 18 when looking in circumferential direction of the tire, there will occur a pressure preload which is caused by the movement of sections 8 in view of the tire inner pressure in the manner of lazy tongs. These pre-loads remain in the finished tire. In this connection the pull and pressure pre-load in rubber parts 16 is particularly advantageous inasmuch as it represents an additional safety against increase in width.

It may additionally be mentioned that the embodiment shows two superimposed carcass layers 1 and 2 but that if desired further double layers may be added. In addition thereto, each layer may consist of two or more individual layers in such a way that the threads or cords of said layers are parallel or practically parallel to each other.

Figure 1A:
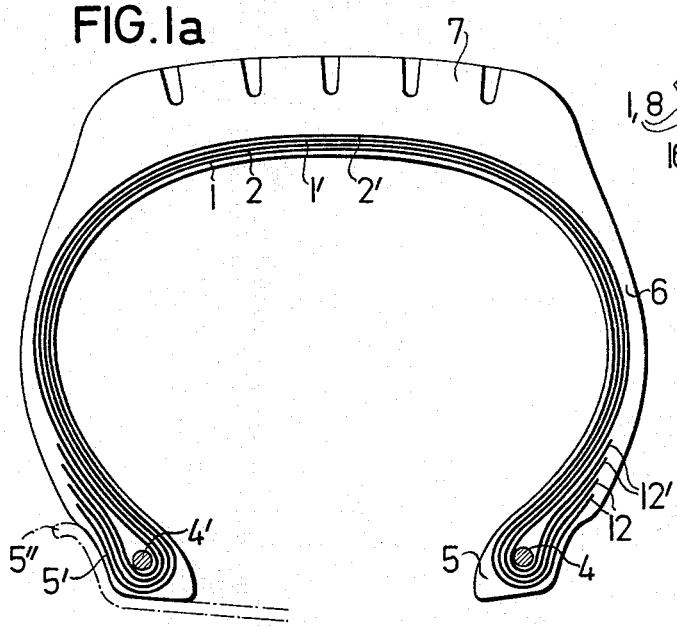
FIG. 1a is a transverse section through a modified pneumatic vehicle tire according to the present invention.

Thus, FIG. 1a shows a pneumatic vehicle tire with two double layers 1, 2 and 1', 2'. Layers 1', 2' are folded around the beads 4 and 4' of the carcass and end in folded back portions 12'. In all other respects the tire, according to FIG. 1a, is identical to that of FIG. 1.

Referring now to the modification of FIG. 6, this modification differs from that of FIG. 2 in that the thread sections 8 which pertain to one layer and are arranged below tread strip 7 extend similar to the arrangement of FIG. 2 from one bead core to the other bead core whereas in contradistinction to the arrangement of FIG. 2 the thread sections 8' below the tread strip and extending in the other inclined direction extend merely over substantially the width of the tread strip. The thread sections 8' have their ends formed by bent portions 9'. so that they form a stretched out S while the bent portions 9' substantially correspond to the bent portions 9 of the threads extending from bead to bead. The thread sections 8' extend over such a width that they end laterally practically on a circumferential line d which is determined by the merging portion between bent portion 9 and thread sections 10 of those threads which extend from bead to bead.

The reinforcing layers illustrated in FIG. 6 are particularly suited for those pneumatic tires which are to be armed by steel cables. The side walls may in view of the arrangement according to the present invention be reinforced by one layer while the cross connection formed by thread sections 8 is arranged below the tread strip 7.

As will be evident from the above, the arrangement of the threads below the tread strip with an inclination of from 5 to 25° with regard to the circumferential direction of the tire will assure that the tire body will obtain the constriction below the tread strip as it is customary with belted tires so that during the operation of the tire no harmful increase in the tire diameter will occur. The zenith portion of the tire will thus be strengthened whereby the wear at the tread strip will be reduced and a sufficiently high lateral stabilization of the tire will be obtained. When looking in the transverse direction of the tire, an undue increase of the tire will be prevented by the mentioned location of the threads. Due to the fact that the threads are closer to each other in the zenith portion of the tire in each of the carcass layers, and relatively thin rubber layers are provided between the threads, a strong interconnection of the threads will be obtained which is well able to withstand lateral, i.e. transversely directed forces.

A favorable construction with regard to increasing the strength of the tire is obtained by the fact that the thread sections in the tire side walls gradually merge over a relatively large diameter of curvature with the inclined thread sections below the tread strip.

The zenith portion of the tire is further favorably affected by the fact that below the tread strip the distance between the carcass layers is greater than within the range of the tire side walls which for purposes of obtaining a greater flexibility provide for closely superimposed carcass layers.

It is, of course, to be understood that the present invention is, by no means, limited to the particular arrangements shown in the drawings but also comprises any modifications within the scope of the appended claims. The term "threads" or "thread means" as it occurs in the claims is intended to include wires.

What I claim is:

1. A pneumatic vehicle tire having a tread strip and two oppositely located side walls and bead cores, which includes: two carcass layers, each of said carcass layers having substantially parallel thread means with a section thereof arranged below said tread strip, the thread means of said two sections crossing each other while respectively forming substantially the same angle with the circumferential direction of the tire, said angle being in the range of from 5 to 25°, the thread means of at least one of said carcass layers extending from below said tread strip in opposite directions through both of said side walls at a substantially right angle with regard to the circumferential direction of said tire and around said bead cores, those portions of said thread means which are located in said side walls being spaced from each other by a greater distance than the distance between those portions of the same thread means which are located below said tread strip.

2. A pneumatic vehicle tire according to claim 1, in which the thread means of both of said carcass layers extend from below said tread strip through both of said side walls at a substantially right angle with regard to the circumferential direction of said tire and around said bead cores.

3. A pneumatic vehicle tire according to claim 1, in which the distance between those carcass layer portions which are located below said tread strip is considerably greater than the distance between those carcass layer portions which are located in the side walls of the tire.

4. A pneumatic vehicle tire according to claim 1, in which the thread means of said sections below said tread strip extend substantially over the width only of said tread strip.

5. A pneumatic vehicle tire according to claim 1, in which each of said carcass layers has only one layer of thread means.

6. A pneumatic vehicle tire according to claim 1, in which said thread means are of steel.

7. A pneumatic vehicle tire having a tread strip and two oppositely located side walls and bead cores, which includes: two carcass layers, each of said carcass layers having substantially parallel thread means with a section thereof arranged below said tread strip, the thread means of said two sections crossing each other while respectively forming substantially the same angle with the circumferential direction of the tire, said angle being in the range of from 5 to 25°, the thread means of at least one of said carcass layers extending from below said tread strip in opposite directions through both of said side walls at a substantially right angle with regard to the circumferential direction of said tire and around said bead cores while said sections pass toward said side walls along relatively large radii of curvature, those portions of said thread means which are located in said side walls being spaced from each other by a greater distance than the distance between those portions of the same thread means which are located below said tread strip.

8. A pneumatic vehicle tire according to claim 7, in which each one of said radii of curvature is a multiple of the diameter of one of said thread means.

9. A pneumatic vehicle tire according to claim 7, in which each one of said raddii of curvature is about from twenty to sixty times the diameter of one of said thread means.

10. A pneumatic vehicle tire having a tread strip and two oppositely located side walls and bead cores, which includes: two carcass layers, each of said carcass layers having substantially parallel thread means with a section thereof arranged below said tread strip, the thread means of said two sections crossing each other while respectively forming substantially the same angle with the circumferential direction of the tire, said angle being in the range of from 5 to 25°, the thread means of at least one of said carcass layers extending from below said tread strip in opposite directions through both of said side walls at a substantially right angle with regard to the circumferential direction of said tire and around said bead cores in such a way that the thread means portions around said bead cores extend in the general direction of said sections below said tread strip, those portions of said thread means which are located in said side walls being spaced from each other by a greater distance than the distance between those portions of the same thread means which are located below said tread strip.

11. A pneumatic vehicle tire according to claim 10, in which the angle formed by those thread means portions which extend around said bead cores with the circumferential direction of the tire is considerably greater than the angle formed by said sections below the tread strip with the circumferential direction of the tire.

12. A pneumatic vehicle tire according to claim 10, in which those thread means portions which extend around the bead cores form with the circumferential direction of the tire an angle within the range of from 50 to 60°.

13. A pneumatic vehicle tire according to claim 10, in which the portions of the thread means extending around the bead cores and respectively located on opposite sides thereof form approximately the same angle with the circumferential direction of the tire but in opposite direction with regard thereto.

14. A pneumatic vehicle tire having a tread strip and two oppositely located side walls and bead cores, which includes two rubberized carcass layers, each of said carcass layers having substantially parallel thread means with a section thereof arranged below said tread strip, the thread means of said two sections crossing each other while respectively forming substantially the same angle with the circumferential direction of the tire, said angle being in the range of from 5 to 25°, the rubber between the thread means of said sections being pre-pullstressed, the thread means of at least one of said carcass layers extending from below said tread strip in opposite directions through both of said side walls at a substantially right angle with regard to the circumferential direction of said tire and around said bead cores, those portions of said thread means which are located in said side walls being spaced from each other by a greater distance than the distance between those portions of the same thread means which are located below said tread strip.

15. A pneumatic vehicle tire having a tread strip and two oppositely located side walls and bead cores, which includes: two carcass layers, each of said carcass layers having substantially parallel thread means with a section thereof arranged below said tread strip, the thread means of said two sections crossing each other while respectively forming substantially the same angle with the circumferential direction of the tire, said angle being in the range of from 5 to 25°, the thread means of at least one of said carcass layers extending from below said tread strip in opposite directions through both of said side walls at a substantially right angle with regard to the circumferential direction of said tire and around said bead cores, those portions of said thread means which are located in said side walls being spaced from each other by a distance within the range of from two to four times the distance between those portions of the thread means which are located below said tread strip.

16. A pneumatic vehicle tire having bead cores and a tread strip and two oppositely located side walls merging with said tread strip so as to form tire shoulders, which includes: two carcass layers, each of said carcass layers having substantially parallel thread means with a section thereof arranged below said tread strip, the thread means of said two sections crossing each other while respectively forming substantially the same angle with the circumferential direction of the tire, said angle being in the range of from 5 to 25°, the thread means of one of said carcass layers extending from below said tread strip in opposite directions through both of said side walls at a substantially right angle with regard to the circumferential direction of said tire and around said bead cores, the thread means of said other carcass layer likewise extending from below said tread strip in opposite directions ending in said shoulders, those portions of said thread means which are located in said side walls being spaced from each other by a greater distance than the distance between those portions of the same thread means which are located below said tread strip.

17. A pneumatic vehicle tire according to claim 16, in which the thread means extend from said sections into said shoulders along arched lines.

18. A pneumatic vehicle tire according to claim 16, in which those portions of the thread means pertaining to said other carcass layer which end in said shoulders extend into said shoulders to an area where the thread means of said one carcass layer which are located in the side walls of the tire extend approximately at a right angle with regard to the circumferential direction of the tire.

References Cited by the Examiner
UNITED STATES PATENTS

| | | | |
|---|---|---|---|
| 2,703,128 | 3/1955 | Darrow | 152—356 |
| 2,930,425 | 3/1960 | Lugli et al. | 152—354 |

ARTHUR L. LA POINT, *Primary Examiner.*

C. W. HAEFELE, *Assistant Examiner.*